US007649804B2

(12) United States Patent
Sinha

(10) Patent No.: US 7,649,804 B2
(45) Date of Patent: Jan. 19, 2010

(54) IN-SITU DETERMINATION OF YIELD STRESS STATE OF EARTH FORMATIONS

(75) Inventor: Bikash K. Sinha, Cambridge, MA (US)

(73) Assignee: Schlumberger Technology Corporation, Cambridge, MA (US)

( * ) Notice: Subject to any disclaimer, the term of this patent is extended or adjusted under 35 U.S.C. 154(b) by 32 days.

(21) Appl. No.: 11/924,388

(22) Filed: Oct. 25, 2007

(65) Prior Publication Data

US 2009/0109794 A1 Apr. 30, 2009

(51) Int. Cl.
G01V 1/00 (2006.01)
(52) U.S. Cl. ........................................... 367/35
(58) Field of Classification Search ............ 367/38, 367/57, 25, 35, 31
See application file for complete search history.

(56) References Cited

U.S. PATENT DOCUMENTS

| 5,111,903 | A | 5/1992 | Meynier |
| 5,181,565 | A | 1/1993 | Czernichow |
| 5,200,581 | A | 4/1993 | Boyle et al. |
| 5,475,650 | A | 12/1995 | Sinha et al. |
| 6,173,804 | B1 | 1/2001 | Meynier |
| 6,289,985 | B1 | 9/2001 | Meynier |
| 6,351,991 | B1 | 3/2002 | Sinha |
| 6,611,761 | B2 | 8/2003 | Sinha et al. |
| 6,712,141 | B1 | 3/2004 | Bussear et al. |
| 7,457,194 | B2 * | 11/2008 | Prioul et al. ............. 367/25 |
| 2004/0176911 | A1 * | 9/2004 | Bratton et al. ............ 702/6 |

FOREIGN PATENT DOCUMENTS

WO 03027717 A1 4/2003

OTHER PUBLICATIONS

Plona et al., "Stress-induced Dipole Anisotropy: Theory, Experiment and Field Data", SPWLA 40th Annual Logging Symposium, May/Jun. 1999.*
Harrison et al., Acquisition and Analysis of Sonic Waveforms from a Borehole Monopole and Dipole Source for the Determination of Compressional and Shear Speeds and Their Relation to Rock Mechanical Properties and Surface Seismic Data, SPE 20557, 1990, pp. 267-282.
Sinha et al., Stress-induced azimuthal anisotropy in borehole flexural waves, Geophysics, 1996, vol. 61, No. 6, pp. 1899-1907.
Bratton et al., Rock Strength Parameters From Annular Pressure While Drilling And Dipole Sonic Dispersion Analysis, SPWLA 45th Annual Logging Symposium, Jun. 6-9, 2004, pp. 1-14.

(Continued)

Primary Examiner—Jack W. Keith
Assistant Examiner—Krystine Saito
(74) Attorney, Agent, or Firm—Helene Raybaud; James McAleenan; Jody Lynn DeStefanis

(57) ABSTRACT

Determination of in-situ rock yield stress state of a geological formation surrounding a borehole includes determining a profile for each of an axial effective, a radial effective, and a hoop effective stress within at least one axial plane containing a borehole axis. A predicted radial shear response radial profile is calculated from the effective stresses within the at least one axial plane. A measurement-based estimate of a shear response radial profile within the at least one axial plane is determined from measured data. A maximum radial distance at which a difference between the predicted and measurement-based shear response radial profiles is identified within the at least one axial plane as being greater than a difference threshold. The respective axial, radial, and hoop stresses, are determined at the identified maximum radial distance. The identified stresses are indicative of an in-situ yield stress state of the rock.

24 Claims, 8 Drawing Sheets

OTHER PUBLICATIONS

Ekstrom, Dispersion Estimation from Borehole Acoustic Arrays Using a Modified Matrix Pencil Algorithm, Proceedings of ASILOMAR-29, IEEE, 1996, pp. 449-453.

Burridge et al., Inversion for Formation Shear Modulus and Radial Depth of Investigation Using Borehole Flexural Waves, Schlumberger-Doll Research, Research Note GEO-002-96-10, Mar. 21, 1996, pp. 1-7.

Backus et al., Uniqueness in the Inversion of Inaccurate Gross Earth Data, Philosophical Transactions of the Royal Society, London, 1970, vol. 266, A. 1173, pp. 123-191.

Jaeger et al., Fundamentals of Rock Mechanics, Chapman and Hall, 1969, Chapter 10, pp. 241-304.

* cited by examiner

IN-SITU DETERMINATION OF YIELD STRESS STATE OF EARTH FORMATIONS

REFERENCED PATENTS

The present application incorporates the following patents by reference: U.S. Pat. No. 6,351,991, issued Mar. 5, 2002, entitled "Determining Stress Parameters of Formations from Multi-Mode Velocity Data," and U.S. Pat. No. 6,611,761, issued Aug. 26, 2003 for "Sonic Well Logging for Radial Profiling,"

FIELD OF THE INVENTION

The present invention relates generally to the field of investigation of Earth formations and, more particularly, to determination of in-situ properties of Earth formations using sonic well logging techniques.

BACKGROUND OF THE INVENTION

Drilling through viscoelastic salt, shale and diatomite formations is a major challenge to avoid uncontrolled borehole shrinkage or expansion that can lead to stuck pipe or heavy fluid loss. Viscoelastic deformation or creep flow of material occurs whenever the octahedral stress exceeds its elastic limit that strongly depends on confining pressure as well as temperature. Rock failure occurs when the octahedral stress exceeds its plastic limit. Currently, the limiting octahedral stresses are obtained by testing a limited amount of core samples in a triaxial cell at various temperatures. The objective of the present invention is to provide a more reliable and cost-effective way of estimating these limiting octahedral stresses under in-situ conditions.

It is well known that mechanical disturbances can be used to establish elastic waves in earth formations surrounding a borehole, and the properties of these waves can be measured to obtain important information about the formations through which the waves have propagated. Parameters of compressional, shear and Stoneley waves, such as their velocity (or its reciprocal, slowness) in the formation and in the borehole, can be indicators of formation characteristics that help in evaluation of the location and/or producibility of hydrocarbon resources. Recent studies of wave propagation in pre-stressed materials indicate that we can invert measured compressional and shear slowness data to estimate formation stress parameters.

An example of a logging device that has been used to obtain and analyze sonic logging measurements of formations surrounding an earth borehole is called a Dipole Shear Sonic Imager ("DSI"—trademark of Schlumberger), and is of the general type described in Harrison et al., "Acquisition and Analysis of Sonic Waveforms From a Borehole Monopole And Dipole Source For The Determination of Compressional and Shear Speeds and Their Relation to Rock Mechanical Properties and Surface Seismic Data," Society of Petroleum Engineers, SPE 20557, 1990. In conventional use of the DSI logging tool, one can present compressional slowness, $\Delta_{tc}$, shear slowness, $\Delta_{ts}$, and Stoneley slowness, $\Delta_{tst}$, each as a function of depth, z. Slowness is the reciprocal of velocity and corresponds to the interval transit time typically measured by sonic logging tools.

An acoustic source in a fluid-filled borehole generates headwaves as well as relatively stronger borehole-guided modes. A standard sonic measurement system consists of placing a piezoelectric source and an hydrophone receivers inside a fluid-filled borehole. The piezoelectric source is configured in the form of either a monopole or a dipole source. The source bandwidth typically ranges from a 0.5 to 20 kHz. A monopole source generates primarily the lowest-order axisymmetric mode, also referred to as the Stoneley mode, together with compressional and shear headwaves. In contrast, a dipole source primarily excites the lowest-order flexural borehole mode together with compressional and shear headwaves. The headwaves are caused by the coupling of the transmitted acoustic energy to plane waves in the formation that propagate along the borehole axis. An incident compressional wave in the borehole fluid produces critically refracted compressional waves in the formation. Those refracted along the borehole surface are known as compressional headwaves. The critical incidence angle $\theta_i = \sin^{-1}(V_f/V_c)$, where $V_f$ is the compressional wave speed in the borehole fluid; and $V_c$ is the compressional wave speed in the formation. As the compressional headwave travels along the interface, it radiates energy back into the fluid that can be detected by hydrophone receivers placed in the fluid-filled borehole. In fast formations, the shear headwave can be similarly excited by a compressional wave at the critical incidence angle $\theta_i = \sin^{-1}(V_f/V_s)$, where $V_s$ is the shear wave speed in the formation. It is also worth noting that headwaves are excited only when the wavelength of the incident wave is smaller than the borehole diameter so that the boundary can be effectively treated as a planar interface. In a homogeneous and isotropic model of fast formations, as above noted, compressional and shear headwaves can be generated by a monopole source placed in a fluid-filled borehole for determining the formation compressional and shear wave speeds. It is known that refracted shear headwaves cannot be detected in slow formations (where the shear wave velocity is less than the borehole-fluid compressional velocity) with receivers placed in the borehole fluid. In slow formations, formation shear velocities are obtained from the low-frequency asymptote of flexural dispersion. There are standard processing techniques for the estimation of formation shear velocities in either fast or slow formations from an array of recorded dipole waveforms.

SUMMARY OF THE INVENTION

A novel technique is described herein allowing for a reliable estimation of in-situ rock yield stresses that help in determining an accurate representation of the elastic and plastic limits of octahedral stress. Since the stresses are a function of pressure and temperature, their in-situ estimation is particularly valuable to the successful drilling and production of a wellbore. Boreholes exhibit complex acoustic behavior complicating such a characterization of a formation from within. Many of the procedures and systems described herein can allow for a determination of the in-situ rock yield stress state using near-wellbore stress distributions and radial alterations in shear slowness in the cross-sectional plane of the wellbore trajectory. The yield stress state can be expressed in terms of the elastic limit and plastic limit of octahedral stress that helps in analyzing the viscoelastic deformation and creep flow in formations that cause borehole shrinkage or expansion that can lead to stuck pipe or heavy fluid loss while drilling. The in-situ estimate of the elastic limit of octahedral stress enables us to calculate a safe mud weight window for a chosen lithology interval.

The viscoelastic deformation of rocks occur when the octahedral stress in the material exceeds the elastic limit that would cause borehole shrinkage or expansion. On the other hand, complete rock failure would occur if the in-situ octahedral stress exceeds the plastic limit of the material. The proposed technique consists of estimating the formation principal stresses and stress parameters that relate changes in the formation principal effective stresses to corresponding changes in the formation compressional and shear velocities. The stress parameters denote the three principal stress coefficients of compressional or shear velocities that can be computed in terms of the three nonlinear constants referred to a reference state close to the in-situ state of the rock. The three nonlinear constants can be obtained from at least the multifrequency inversion of cross-dipole dispersions. The inversion of wideband dipole dispersions in the presence of crossovers yields the maximum and minimum horizontal stress magnitudes together with the three formation nonlinear constants. The nonlinear constants are then used to compute nine stress coefficients of plane wave velocities. Other techniques can also be used to estimate formation nonlinear constants as described in U.S. Pat. No. 5,475,650 entitled "Measurement of nonlinear properties of formation using sonic borehole tool while changing pressure in borehole". The nine stress coefficients of plane wave velocities comprise the effective overburden, maximum horizontal, and minimum horizontal stress coefficients of the compressional, fast-shear, and slow-shear velocities.

One embodiment of the invention relates to a procedure for determining an in-situ rock yield stress state of a geological formation surrounding a borehole. A radial profile for each of an axial effective stress, a radial effective stress, and a hoop effective stress is determined within at least one axial plane containing a borehole axis. A predicted radial shear response radial profile is determined from the effective stresses within at least one axial plane. A measurement-based estimate of a shear response radial profile within at least one axial plane is determined from measured data. A maximum radial distance at which a difference between the predicted shear response radial profile is identified within at least one axial plane, and the measurement-based estimated shear response radial profile is greater than a difference threshold. The respective axial, radial, and hoop stresses, are determined at the identified maximum radial distance. The resulting stresses are indicative of an in-situ yield stress state of the rock.

Another embodiment of the invention relates to a procedure for determining an in-situ rock yield stress state of a geological formation surrounding a borehole, including determining, in each of a fast-shear and slow-shear azimuthal directions, a respective radial profile for each of an axial effective stress, a radial effective stress, and a hoop effective stress. A respective predicted radial profile for each of a fast-shear response and a slow-shear response is determined from the effective stresses, in each of the fast-shear and slow-shear azimuthal directions. A measurement-based estimate of a respective radial profile of shear response in each of the fast-shear and slow-shear azimuthal directions is determined from measured data. A respective maximum radial distance is identified in each of the fast-shear and slow-shear azimuthal directions, at which a difference between the respective predicted shear response radial profile and the respective measurement-based estimated shear response radial profile determined is greater than a difference threshold. The respective axial, radial, and hoop stresses are determined at the identified maximum radial distance, in each of the fast-shear and slow-shear azimuthal directions. The resulting stresses are indicative of an in-situ yield stress state of the rock.

Another embodiment of the invention relates to a procedure for determining an in-situ rock yield stress state of a geological formation surrounding a borehole, including estimating a far-field formation effective stresses and stress coefficients of shear response. Dipole radial profiles of formation shear response are estimated along each of the fast-shear and slow-shear azimuthal directions using measured data. Radial profiles of formation shear response are calculated in each of a fast-shear and slow-shear azimuthal directions. Radial position are identified at which measured radial profile deviates from theoretical radial profile beyond a deviation threshold. The effective stress values are determined at the identified radial position, the identified stress values indicative of an in-situ yield stress state of the geological formation at the depth interval.

Another embodiment of the invention relates to a system for determining an in-situ rock yield stress state of a geological formation surrounding a borehole. The system includes a borehole logging tool adapted for placement at a desired depth interval within the borehole. The logging tool is configured to excite a sonic response within the borehole and to record multiple waveforms indicative of the sonic response within the depth interval. The system also includes a processor in communication with the borehole sonic logging tool. The processor adapted to receive a number of waveforms and to analytically determine predicted shear response radial profile in terms of radial variations of each of axial, radial, and hoop effective stresses. The processor is also adapted (i) to estimate from the received number of waveforms, a respective measurement-based radial profile of shear response, (ii) to determine a respective maximum radial distance at which a difference between the respective predicted shear response radial profile and the respective measurement-based estimated response radial profile determined from measured data is greater than a difference threshold, and (iii) to identify at the determined maximum radial distance the respective axial, radial, and hoop effective stresses, the effective stresses providing an indication of an in-situ yield stress state of the rock.

Yet another embodiment of the invention relates to a system for determining an in-situ rock yield stress state of a geological formation surrounding a borehole. The system includes means for determining theoretically, in each of a fast-shear and slow-shear azimuthal directions, a respective predicted radial profile for each of an axial, a radial, and a hoop effective stresses. The system also includes means for calculating from the predicted effective stresses, in each of the fast-shear and slow-shear azimuthal directions, a respective radial variation for each of a fast-shear response and a slow-shear response. Means are also provided for determining from measured data, in each of the fast-shear and slow-shear azimuthal directions, a measurement-based estimate of a respective radial profile of shear response. Means are also provided for identifying in each of the fast-shear and slow-shear azimuthal directions, a respective maximum radial distance at which a difference between the respective predicted shear response radial profile and the respective measurement-based estimated shear response radial profile is greater than a difference threshold. Also provided are means for determining at the identified maximum radial distance, in each of the fast-shear and slow-shear azimuthal directions, the respective axial, radial, and hoop stresses. The resulting stresses are indicative of an in-situ yield stress state of the rock.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF THE PREFERRED EMBODIMENTS

A new technique for estimating the in-situ rock yield stress state is described herein using radial profiling of shear slownesses along the maximum and minimum horizontal stress directions. The technique uses predicted values together with known formation stress parameters obtained from an inversion of cross-dipole dispersions. The in-situ yield stress state can then be used to calculate one or more of the elastic limits of octahedral stress and unconfined compressive strength. Such values are required for any reliable wellbore stability analysis.

One of the most important inputs to the wellbore stability analysis during and after drilling is an estimate of in-situ rock yield stress state or rock strength. The yield stress state can be used to calculate the octahedral stress threshold that helps in estimating a safe mud weight or wellbore pressure range to avoid large fluid loss or wall collapse. In particular, effects of viscoelastic deformation or creep flow in salt or shale formations can be better predicted if we have a reliable estimate of the elastic limit of octahedral stress in the presence of in-situ confining pressure and temperature. Elastic and plastic limits of octahedral stress can provide useful indicators for the initiation of creep flow and complete failure, respectively. The creep flow of viscoelastic salt or shale formations can cause borehole shrinkage resulting in "stuck-pipe," or expansion in the presence of non-optimal mud weight.

Generally, the elastic and plastic limits of octahedral stress for a given rock lithology can be obtained from a limited amount of core data as a function of confining pressure and temperature. Often extrapolating the elastic and plastic limits of octahedral stress obtained in the laboratory to downhole conditions can have limitations. Moreover, it is known that elastic and plastic limits of octahedral stress decrease significantly with increasing temperatures and confining pressures. Therefore, estimates of in-situ elastic and plastic limits of octahedral stress for a given rock lithology would enable a more reliable viscoelastic deformation analysis of salt formations and provide an optimal mud weight window to avoid borehole instability during and after drilling.

Figure 1:
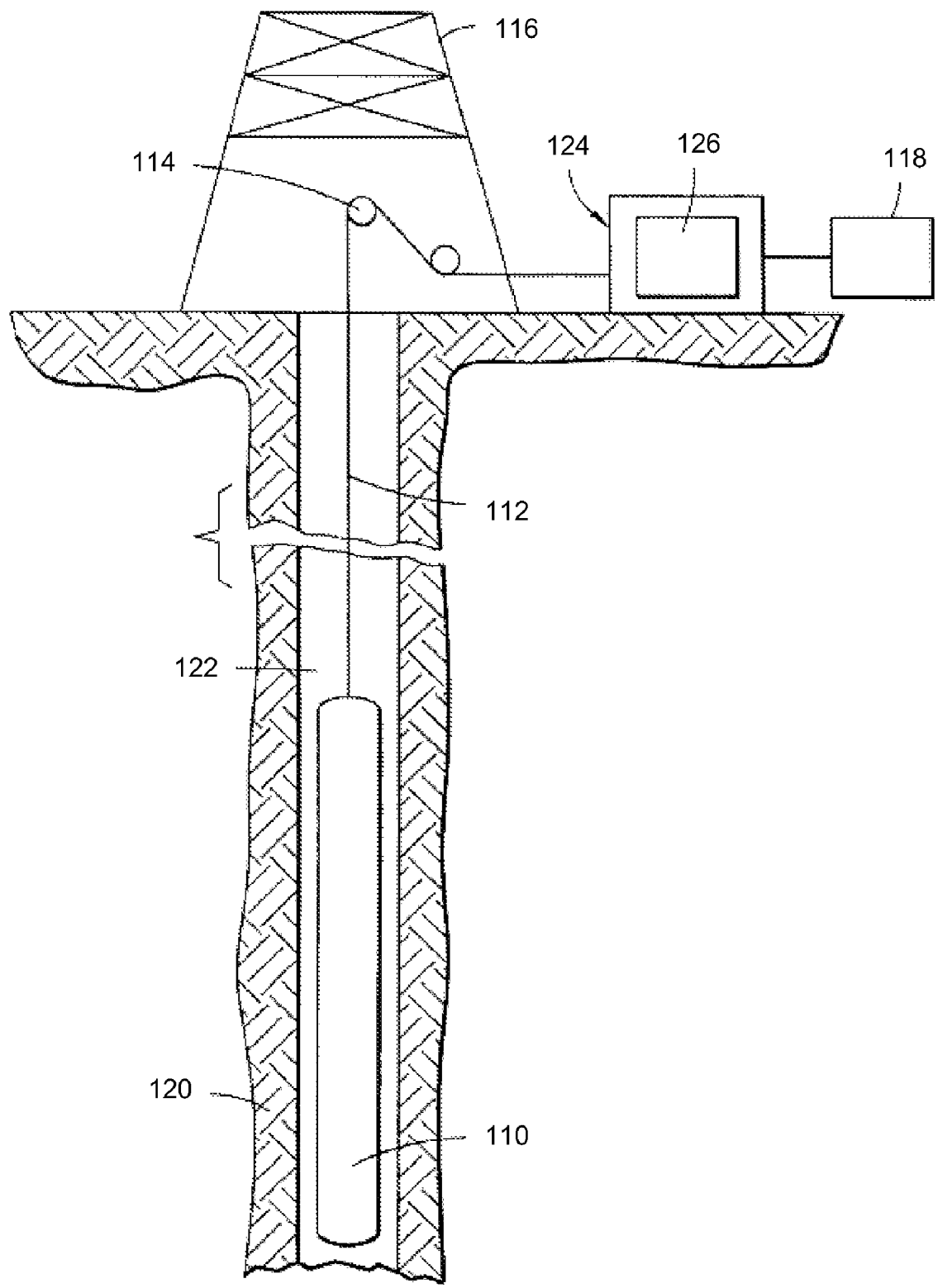
FIG. 1 is a diagram, partially in block form, of a type of apparatus that can be used in practicing embodiments of the invention.

Referring to FIG. 1, there is shown a type of apparatus that can be used in practicing many of the embodiments of the invention. Subsurface formations 120 are traversed by a borehole 122 which is typically, although not necessarily, filled with drilling fluid or mud. A logging tool 110 is suspended on an armored cable 112 and may have optional centralizers (not shown). The cable 112 extends up the borehole, over a sheave wheel 114 on a derrick 116 to a winch forming part of surface equipment 124. Known depth gauging apparatus (not shown) is provided to measure cable displacement over the sheave wheel 114 and accordingly the depth of the logging tool 110 in the borehole 122. A device of a type well known in the art is included in the tool 110 to produce a signal indicative of orientation of the body of the tool 110. Processing and interface circuitry within the tool 110 amplifies, samples and digitizes the tool's information signals for transmission and communicates them to the surface equipment 124 via the cable 112. Electrical power and control signals for coordinating operation of the tool 110 can be generated by the surface equipment 124 and communicated via the cable 112 to circuitry provided within the tool 110. The surface equipment includes processor subsystem 126 (which can typically include a microprocessor, memory, clock and timing, and input/output functions—not separately shown), standard peripheral equipment (not separately shown), and recorder 118.

Figure 2:
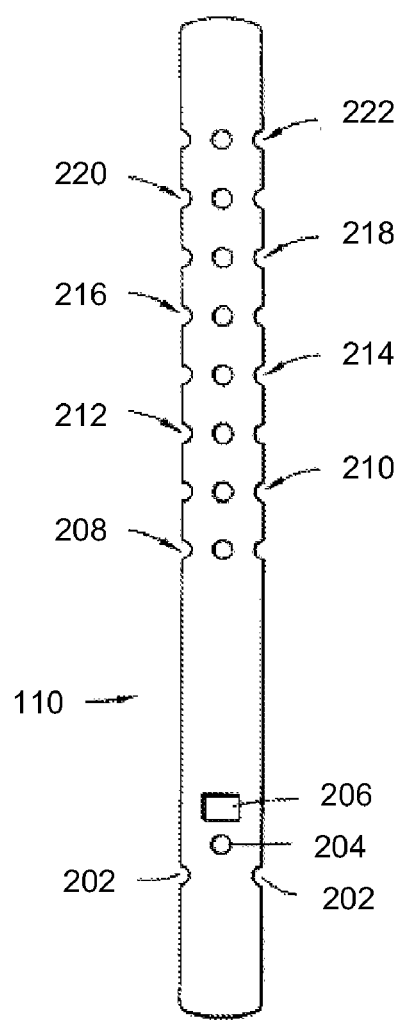
FIG. 2 is a simplified diagram of a type of downhole logging device that can be used in practicing embodiments of the invention.
Figure 3:
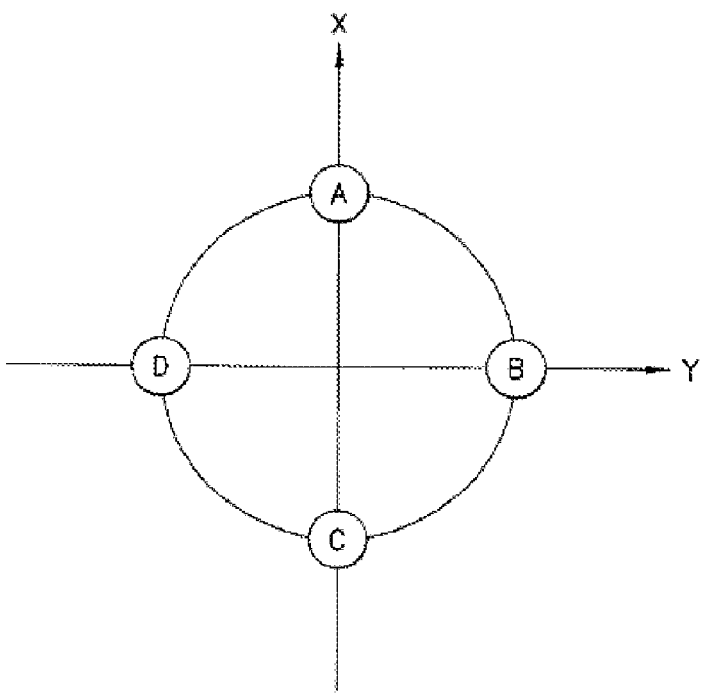
FIG. 3 is a diagram illustrating, in cross section, the placement of hydrophones that can be used at a receiver station in the logging device of FIG. 3.

The logging device 110 may be, for example, of a type known as a Dipole Shear Sonic Imager ("DSI"—trademark of Schlumberger) generally described in Harrison et al., "Acquisition and Analysis of Sonic Waveforms From a Borehole Monopole and Dipole Source for the Determination of Compressional and Shear Speeds and Their Relation to Rock Mechanical Properties and Surface Seismic Data," Society of Petroleum Engineers, SPE 20557, 1990. It will be understood, however, that any suitable logging device can be utilized. Further details of the logging device 110 of this example are shown in FIG. 2. The logging device 110 includes crossed dipole transmitters 202 and 204 (only one end of dipole 204 being visible) and a monopole transmitter 206, so that waves including compressional, shear, Stoneley, and flexural can be excited. Eight, or other suitable number, of spaced apart receiver stations, designated 208 through 222 each comprise four receiver hydrophones mounted azimuthally at ninety degree intervals in the surface of the cylindrical logging device. FIG. 3 shows the hydrophones, designated A, B, C, and D. In an example shown in FIG. 4, an X component can be obtained by subtracting the signals received at A and C (i.e., A-C), and a Y component can be obtained by subtracting the signals received at B and D (i.e., B-D). With four receiver elements at each receiver station, there are a total of thirty two receiver elements in this example. The receiver stations are also configurable for monopole reception. For example, monopole reception can be obtained by summing the signals received from the multiple hydrophones of a given receiver section.

The transmitter electronics contain a power amplifier and switching circuitry capable of driving the two crossed-dipole transmitter elements 202, 204 and the monopole element 206 from a programmable waveform. Separate waveforms with appropriate shape and frequency content can be used for dipole, Stoneley and compressional measurements. Receiver electronics processes the signals from the 32 individual receiver elements located at the eight receiver stations 208-222. In the exemplary device, the receiver stations are spaced six inches apart. At each station 208-222, four receivers A, B, C, and D are mounted as shown in FIG. 3. Such a configuration allows measurement of dipole and crossed-dipole waveforms by differencing the outputs from opposite receivers, as previously described. Summing the outputs of the receivers can be used to produce a monopole equivalent signal. As further described in Harrison et al., supra, receiver electronics include multiplexers, filters, and amplifiers to channels signals from the 32 receiver elements to eight parallel signal paths. In the exemplary device, these eight parallel analog signals are passed to an acquisition electronics cartridge in which eight 12-bit analog-to-digital converters digitize the signals from the receiver electronics. The telemetry circuitry passes the digitized information to the earth's surface.

Figure 4:
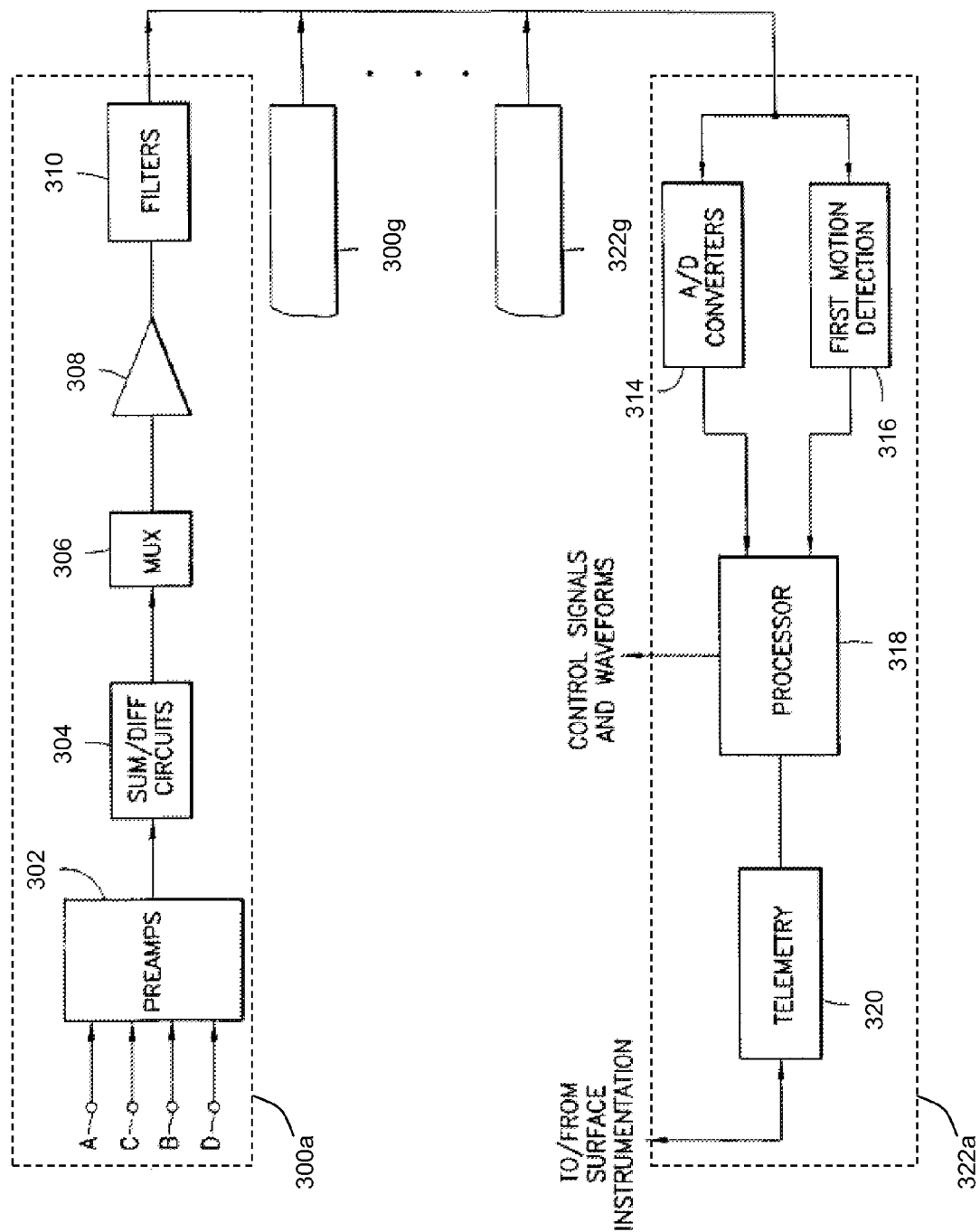
FIG. 4 is a block diagram of a portion of the electronics of the FIG. 2 logging device.

FIG. 4 shows an example of the acquisition signal path in block diagram form for one of the eight (or other suitable number of) receiver stations, as described in Harrison et al., supra. Each receiver has its own charge preamplifier 302. The output of the receivers 300, odd numbered pairs being in-line with the upper dipole transmitter and even numbered pairs with the lower dipole transmitter, passes into both a summing circuit (for monopole measurements) and a differencing circuit (for dipole measurements), as represented at 304. Under software control, the sum or difference is selected by a multiplexer stage 306 and the resulting signal passed to one of eight programmable gain amplifier stages 308 and filters 310. The other similar channels are represented by block 300b. Each of the eight parallel analog signals is passed to a respective one of the eight parallel 12-bit A/D converters 314 in which simultaneous waveform digitization is performed. If desired, more bits can, of course, be used to advantage. After digitization, the eight waveforms are passes to a memory section associated with downhole processor 318. The processor 318 also provides control signals and waveforms to transmitter and receiver electronics. Such control signals can include selection of waveforms, activation of one or more of the transmitters, selection of monopole or dipole mode configuration within the receivers, etc. An alternate path directs the eight analog receiver signals into threshold crossing detection circuitry or digital first motion detection, as represented at block 316. This circuitry 316 detects the time of all up or down going threshold crossings. The digitized waveform data and the threshold crossing time data are passed to the surface using a telemetry circuitry 320. It will be understood that more advanced tool implementations, having further transmitters, receivers, and/or transmitter-to-receiver (T/R) spacings, and more powerful processing capabilities, can be used even more advantageously, consistent with the principles hereof, in practicing embodiments of the invention. Alternatively or in addition, the logging tool may include an internal processor to accomplish some or all of the associated processing including control.

In the FIG. 2 embodiment, the processing of signals recorded from above the borehole (i.e., uphole) can be implemented using a processor 126, such as a suitably programmed general purpose digital processor with memory and peripherals conventionally provided. It will be understood, however, that the processing need not be performed at the well site, and that signals derived at the well site can be processed at a remote location. It will also be understood that other suitable logging tools can be employed in practicing the invention.

The presence of a borehole within a formation subject to tectonic stresses causes both radially and azimuthally varying stress concentrations. These near-wellbore stresses cause the formation shear velocity to increase with increasing radial position in the direction parallel to the maximum far-field horizontal stress direction. In contrast, the shear velocity decreases in the direction perpendicular to the maximum far-field horizontal stress direction.

As above noted, a dipole source in a fluid-filled borehole generates dispersive borehole flexural modes. The radial depth of investigation of these modes extend to about a wavelength at a given frequency. Low-frequency flexural waves probe deep and high-frequency waves probe shallow. Consequently, a dispersion analysis of borehole flexural modes can provide more detailed information about the formation than is possible with compressional and shear headwave logging. A cross-dipole dispersion crossover is an indicator of stress-induced anisotropy dominating the measurement over formation intrinsic anisotropy. In addition, very low flexural velocities at higher frequencies can indicate mechanical damage near the borehole surface.

An estimate of the radially varying shear slownesses is obtained. Such an estimate can be obtained from measured dipole dispersions using Backus-Gilbert (B-G) type of inversion (see G. Backus and F. Gilbert, Uniqueness In The Inversion Of Inaccurate Gross Earth Data; Phil. Trans. Roy. Soc. (London), A266, 123-192, 1970). As will be demonstrated, in the case of an isotropic section, the cross-dipole dispersions coincide with each other and the radial variation in shear slowness is essentially uniform. In the presence of a dipole dispersion crossover, radial variations in shear slownesses with radial polarizations parallel and perpendicular to the maximum stress direction exhibit a characteristic crossover that is consistent with the mapping of stress concentrations into plane wave velocity distributions (see B. Sinha and S. Kostek, Stress-induced Azimuthal Anisotropy In Borehole Flexural Waves, Geophysics, 61, 1899-1907, 1996).

Analyses of cross-dipole logs in a horizontal well provide information about the formation's mechanical competence that can help in planning for cased-versus open-hole completion. Large magnitudes of stress-induced shear anisotropy are indicators of borehole sections that might lead to mechanical failure more readily than sections that exhibit shear isotropy in a plane perpendicular to the borehole axis for a given rock shear strength. Large shear anisotropy caused by biaxial stresses in the plane perpendicular to the borehole axis is indicative of a potential near-wellbore mechanical damage either in the form of tensile fractures or wellbore breakouts. Shear isotropy is indicative of a stable borehole and is confirmed when the two orthogonal flexural dispersions coincide with one another.

Near-wellbore alteration can be caused by several sources, such as, overbalance drilling, borehole stress concentrations, shale swelling, near-wellbore mechanical damage and supercharging of permeable formations.

Figure 5:
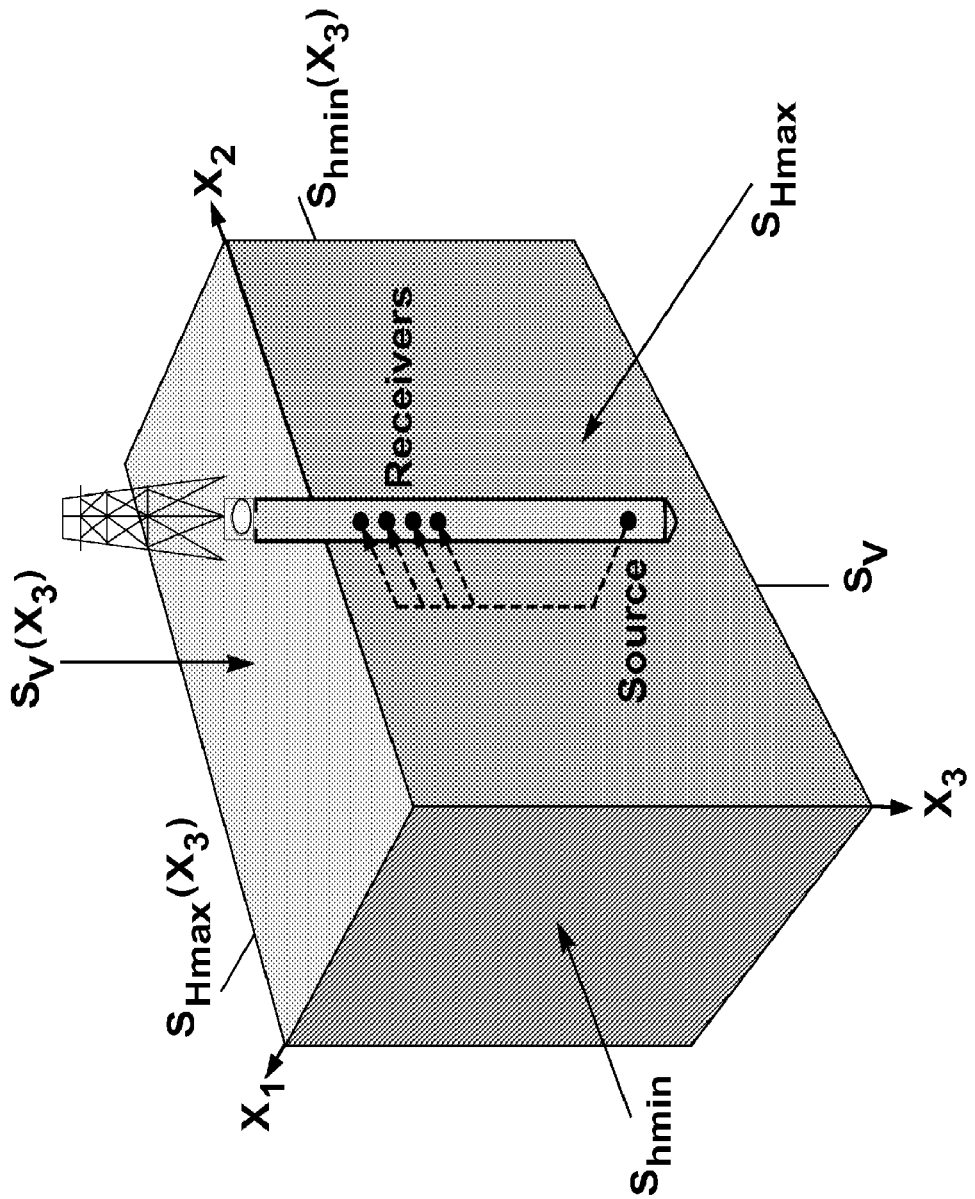
FIG. 5 is a schematic diagram of a borehole in an Earth formation subject to the far-field principal stresses.

FIG. 5 shows a schematic diagram of a borehole in a formation subject to the far-field principal stresses. The vertical borehole is shown to be in alignment with the $X_3$ axis. In the exemplary embodiments describe herein, the borehole axis is parallel to the overburden stress. Acting upon the formation are overburden stress $S_V$, maximum horizontal stress $S_{hmax}$, and minimum horizontal stress $S_{hmin}$ in a far-field with reference to the borehole. In particular, the stresses vary as a function of depth $X_3$ measured along the borehole, such that the stress can be represented as $S_V(X_3)$, $S_{hmax}(X_3)$, and $S_{hmin}(X_3)$.

Figure 6:
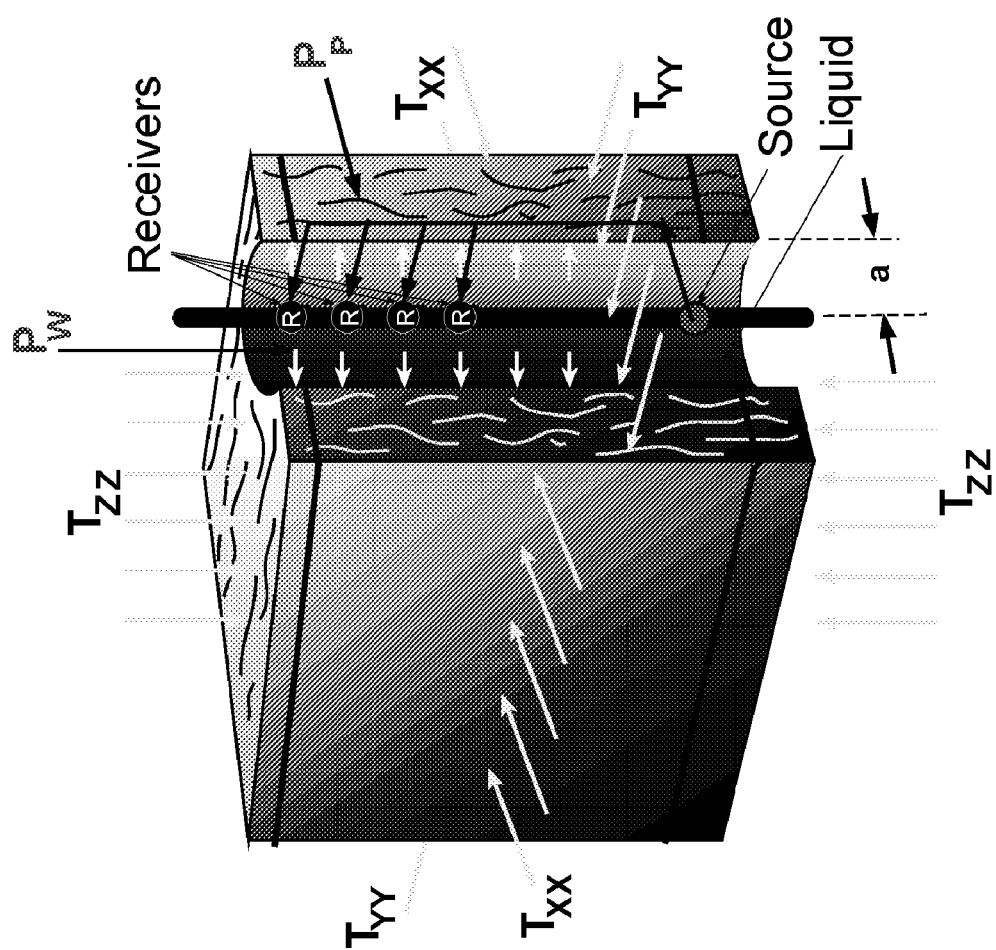
FIG. 6 is a more detailed schematic diagram of a depth interval of a borehole of radius "a" subject to the formation stresses in a poroelastic rock, with pore fluid pressure $P_P$.

FIG. 6 displays in more detail a schematic diagram of a borehole of radius "a" subject to the formation stresses in a poroelastic formation with pore pressure $P_P$ and wellbore pressure $P_W$. Also shown are the triaxial stresses $T_{xx}$, $T_{yy}$, and $T_{zz}$. Note that sonic velocities or slownesses are sensitive to effective stresses in the propagating medium. Also note that sonic velocities or slownesses are sensitive to effective stresses in the propagating medium. An effective stress $\sigma_{ij}$ is represented in equation (1).

$$\sigma_{ij}=T_{ij}-\delta_{ij}P_P \quad (1)$$

In this expression, $T_{ij}$ represents an applied stress, $\delta_{ij}$ is the Kronecker delta, and $P_P$ represents a pore pressure. Also shown within the borehole is an exemplary logging device, such as the device shown and described in relation to FIG. 1 through FIG. 4.

The presence of a borehole causes near-wellbore stress distributions that can be described by the following predictive equations (Jaeger and Cook, 1969). For a cylindrical coordinate system:

$$\sigma_{rr} = \frac{(\sigma_H+\sigma_h)}{2}\left(1-\frac{a^2}{r^2}\right)+\frac{(\sigma_H-\sigma_h)}{2}\left(1-\frac{4a^2}{r^2}+\frac{3a^4}{r^4}\right)\cos 2\theta - P_W\frac{a^2}{r^2}, \quad (2)$$

$$\sigma_{\theta\theta} = \frac{(\sigma_H+\sigma_h)}{2}\left(1-\frac{a^2}{r^2}\right)-\frac{(\sigma_H-\sigma_h)}{2}\left(1+\frac{3a^4}{r^4}\right)\cos 2\theta + P_W\frac{a^2}{r^2}, \quad (3)$$

$$\sigma_{r\theta} = -\frac{(\sigma_H-\sigma_h)}{2}\left(1+\frac{2a^2}{r^2}-\frac{3a^4}{r^4}\right)\sin 2\theta, \quad (4)$$

$$\sigma_{ZZ} = \sigma_V - \nu\frac{(\sigma_h-\sigma_h)}{2}\frac{2a^2}{r^2}\cos 2\theta, \quad (5)$$

where $\sigma_{rr}$, $\sigma_{\theta\theta}$, $\sigma_{r\theta}$, and $\sigma_{ZZ}$ denote the radial, tangential or hoop, radial-shear, and axial stresses, respectively; $\sigma_V$, $\sigma_H$, and $\sigma_h$ represent the far-field overburden, maximum horizontal, minimum horizontal stresses, respectively; a denotes the borehole radius, and $\theta$ is the azimuth measured from the maximum horizontal stress direction. Far-field includes radial distances of greater than about 3 wellbore diameters.

Figure 7A:
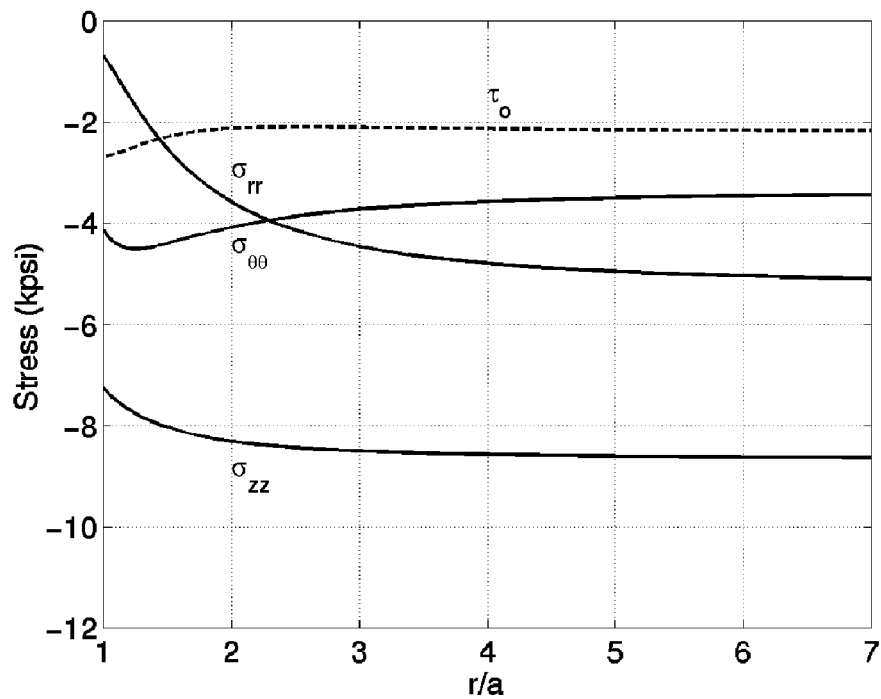
FIG. 7A is a graph illustrating predicted radial variation of the axial ($\sigma_{ZZ}$), hoop ($\sigma_{\theta\theta}$), and radial ($\sigma_{rr}$) effective stresses at an azimuth parallel to the maximum horizontal stress direction at a given depth.

FIG. 7A shows the predicted radial variation of axial ($\sigma_{ZZ}$), hoop ($\sigma_{\theta\theta}$), and radial ($\sigma_{rr}$) effective stresses at an azimuth parallel to the maximum horizontal stress direction at a given depth. These stress variations are calculated from equations (2)-(5) for the case of $\theta=0$ degree. The figure illustrates how the principal stresses change in magnitude as they approach a vertical wellbore for the case of equal horizontal stresses. Notice that the largest differential stress at the borehole surface (i.e., r/a=1) is about 6 kpsi. The dashed curve represents the octahedral stress ($\tau_0$) plotted as a function of radial position, normalized to the radius of the borehole, and in a position away from the borehole surface.

Figure 7B:
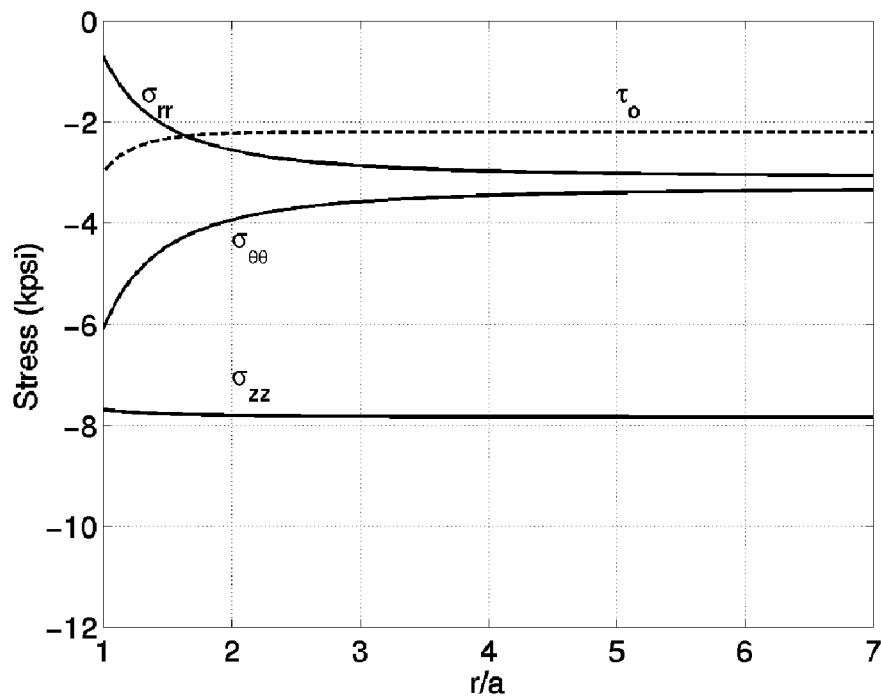
FIG. 7B is a graph illustrating predicted radial variation of the axial ($\sigma_{ZZ}$), hoop ($\sigma_{\theta\theta}$), and radial ($\sigma_{rr}$) effective stresses at an azimuth perpendicular to the maximum horizontal stress direction at a given depth.

FIG. 7B displays the predicted radial variation of axial ($\sigma_{ZZ}$), hoop ($\sigma_{\theta\theta}$), and radial ($\sigma_{rr}$) effective stresses at an azimuth perpendicular to the maximum horizontal stress direction. The corresponding stress distributions at an azimuth perpendicular to the maximum horizontal stress direction are also calculated from equations (2)-(5) for the case of $\theta=90$ degrees. Notice that the largest differential stress at the borehole surface (i.e., r/a=1) is about 7 kpsi. Again, the dashed curve represents the octahedral stress ($\tau_0$) plotted as a function of radial position, normalized to the radius of the borehole, and in a position away from the borehole surface.

Figure 8A:
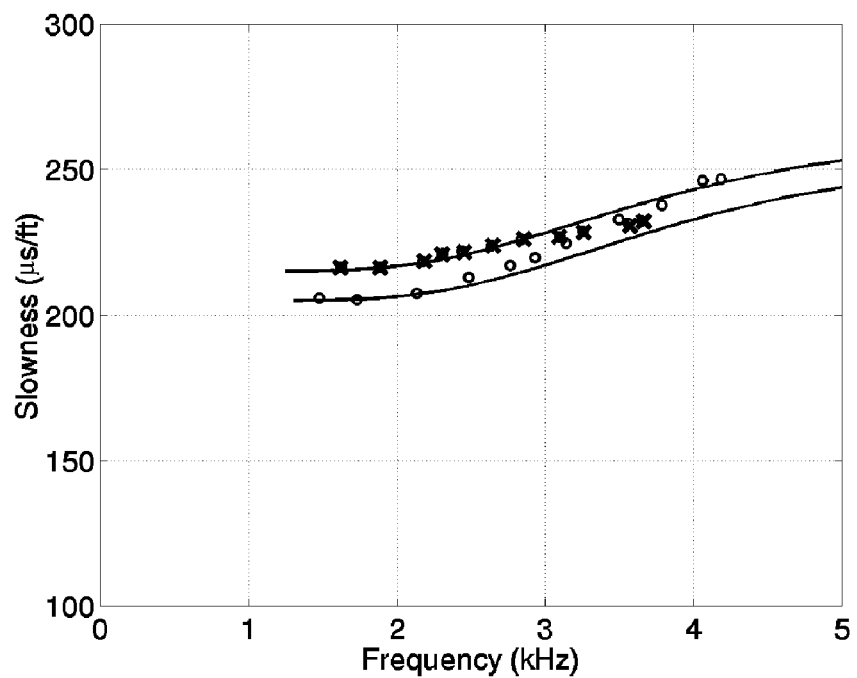
FIG. 8A is a graph illustrating measured fast and slow flexural dispersions shown by discrete circles and crosses, respectively, together with the corresponding equivalent-isotropic flexural dispersions (shown by solid curves) for a radially homogeneous formation used in obtaining radial variation of fast-shear and slow-shear slownesses along the maximum and minimum horizontal stress directions.

FIG. 8A shows radial variation of the fast- and slow-shear flexural dispersions as a function of frequency along the maximum and minimum horizontal stress directions. The circles and crosses represent a typical cross-dipole dispersions estimated from the recorded dipole waveforms at an array of receivers for slow (top curve) and fast-shear (bottom curve) slowness. The discrete circles represent fast flexural dispersions determined from measured data. The discrete crosses represent slow flexural dispersions also determined from measured data. These waveforms can be processed by a modified matrix pencil algorithm (M. P. Ekstrom, "Dispersion Estimation From Borehole Acoustic Arrays Using A Modified Matrix Pencil Algorithm," presented at the 29th Asilomar Conference on Signals, Systems, and Computers, 1995) that yields the dominant non-dispersive and dispersive arrivals in the wave train. The solid upper and lower curves represent calculated equivalent-isotropic flexural dispersion variations as a function of frequency for the two radially homogeneous and isotropic formations.

Figure 8B:
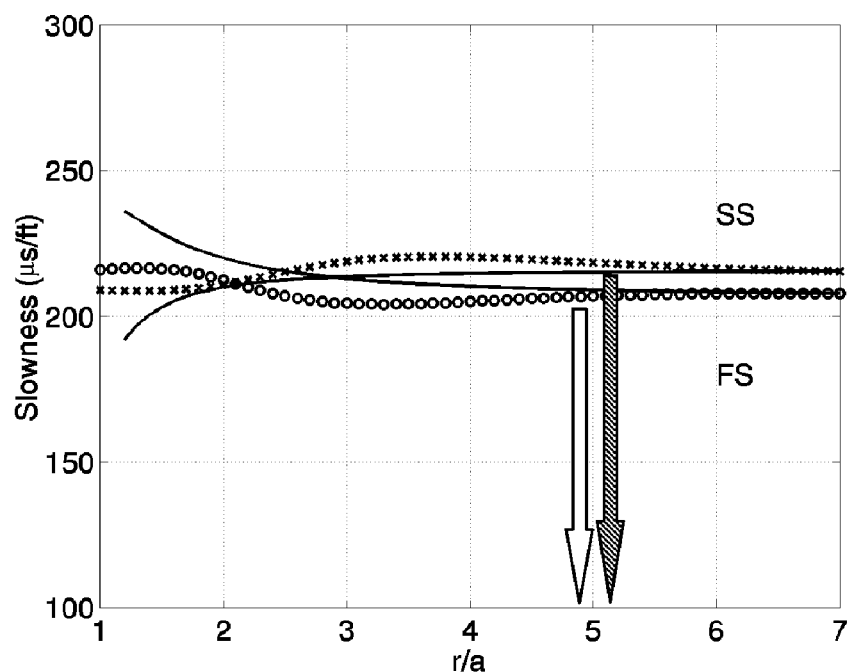
FIG. 8B is a graph illustrating measured radial profiles of the fast and slow-shear slowness overlaid upon predicted fast and slow-shear slowness values.

FIG. 8B shows an overlay of measurement-based estimated radial profiles of the fast- and slow-shear slownesses determined from the fast and slow-shear flexural dispersions illustrated in FIG. 8A with those of the theoretical or predicted fast and slow shearness profiles obtained using the formation stress coefficients of shear slownesses together with the principal stress variations shown in FIG. 7A and FIG. 7B, respectively. The measurement-based estimated radial profiles of shear slownesses can be obtained using a technique as described in U.S. Pat. No. 6,611,761, issued Aug. 26, 2003 for "Sonic Well Logging for Radial Profiling," and incorporated herein by reference in its entirety. The technique described therein yields radial profiles of fast and slow shear slownesses determined from the measured dipole flexural dispersions in the two orthogonal directions characterized by the shear moduli $C_{44}$ and $C_{55}$ for a borehole parallel to the $X_3$-axis in an orthorhombic formation. The two arrows in FIG. 8B indicate the maximum radial positions (r/a=5, approximately) at which the measured fast-shear (left arrow) and slow-shear (right arrow) slowness profiles start to deviate from those theoretically predicted from a model that does not account for any plastic yielding of the rock. The near-wellbore stresses can then be determined at these radial positions using the relationships presented graphically in FIG. 7A and FIG. 7B, for azimuths along the maximum and minimum horizontal stress directions, respectively. These three principal stresses define the rock in-situ yield stress state that can then be used to determine nine stress coefficients of plane-wave velocities and to further determine the elastic limit of octahedral stress. The corresponding octahedral stresses are also shown by dashed lines in FIG. 7A and FIG. 7B.

Figure 9:
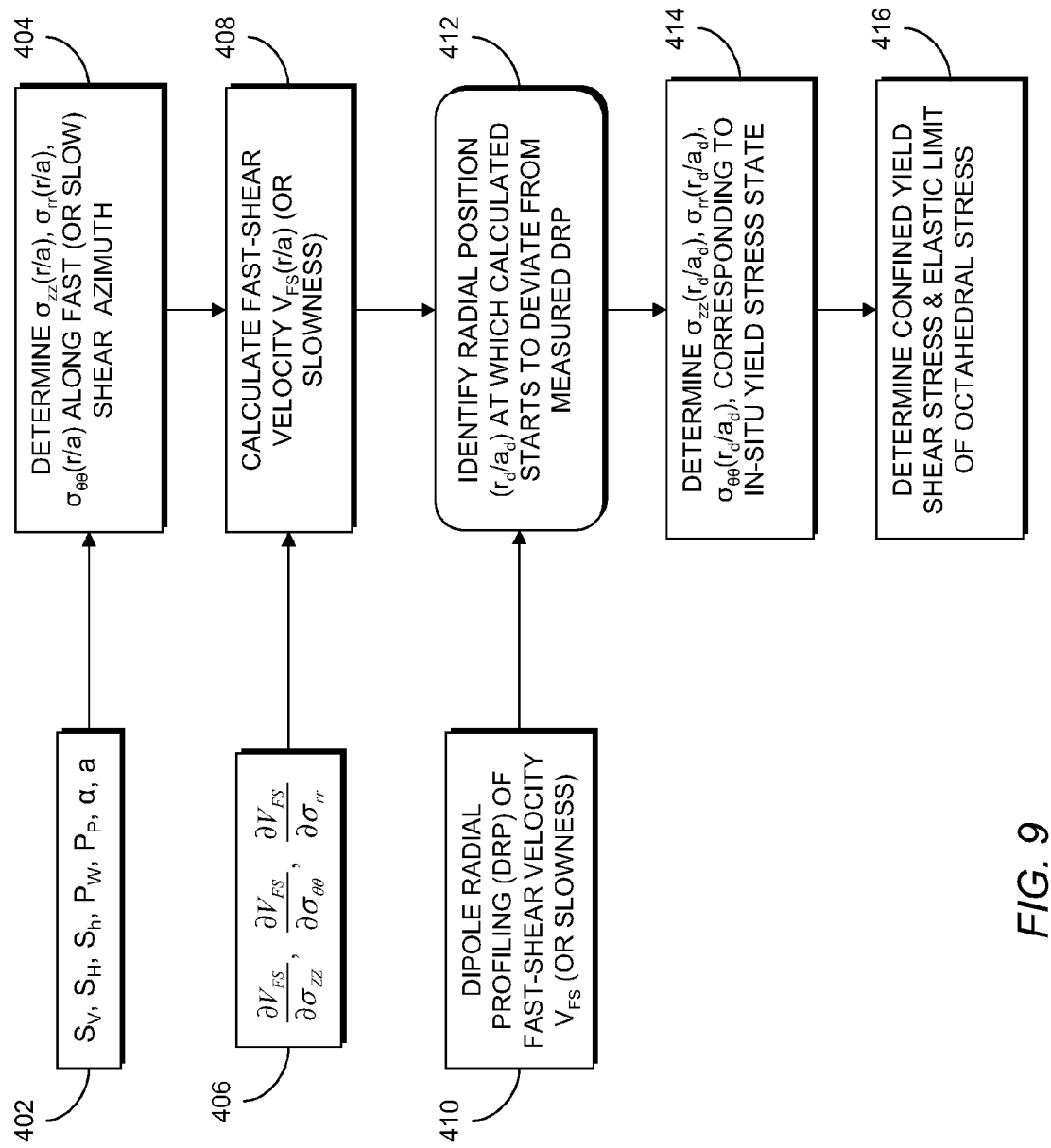
FIG. 9 is a flow-chart showing various steps in the estimation of in-situ yield stress state and elastic and plastic limits of the octahedral stress.

FIG. 9 displays a flow-chart showing various steps of an exemplary procedure for estimating in-situ yield stress state and elastic and plastic limits of the octahedral stress. The presence of a borehole causes stress concentrations in an annular volume around the borehole. An estimate of these stress concentrations can be predicted using linear theory of elasticity (Step 404). The near-wellbore stress distribution can be described in terms of radial and azimuthal variations of axial, radial, and hoop stresses. One or more of these input values are provided at Step 402 for use within the estimation step 303. The resulting values can be represented graphically as a function of radial positions along the fast-shear and slow-shear azimuths (FIG. 7A and FIG. 7B). Alternatively or in addition, the functional relationships can be programmed for direct lookup or estimation without a graph. Such a lookup could be accomplished by tabulating results across a desired range of radii and using the table, interpolating if necessary, to obtain one or more of the programmed values.

Predicted radial variations of the fast- and slow-shear slownesses are calculated at step 408 in a direction away from the borehole surface. In some embodiments, the calculation uses stress coefficients of shear velocities and known stress variations determined from the theory of elasticity at step 406. The resulting radial variations of shear slownesses show effects of near-wellbore stresses in the absence of any plastic yielding of rock. Once again, the results can be represented graphically (FIG. 8B) and/or as a programmed relationship.

Measurement-based estimates of the radial variation of shear slownesses are determined along the fast- and slow-shear azimuths by inverting the measured cross-dipole flexural dispersions as described in U.S. Pat. No. 6,611,761. In some embodiments, both increasing and decreasing shear slowness profiles can be estimated using Backus-Gilbert (B-G) inversion of measured cross-dipole dispersions (Burridge and Sinha, 1996). In another embodiment, the sonic tool can be run in multiple modes (e.g., Stoneley and dipole) to acquire a complete set of data to enable unambiguous interpretation of near-wellbore and far-field formation parameters.

The radial position are identified (Step 412) at which the measured slowness profile deviates from the theoretical shear slowness profile calculated in the absence of any plastic yielding. At least one manner of making such an identification is to overlay predicted values of shear slownesses along the fast- and slow-shear azimuths (Step 408) and measurement-based variations of the same (Step 410). Starting from a radial position in the far field (e.g., beyond a radius of 3 wellbore diameters), determine a difference between each of the respective measurement-based and predicted values. If the difference is less than a predetermined threshold, move into a closer radius and repeat. Repeat this process until a first determination that the difference is greater than the threshold value. Store the respective radius at which the difference exceeds the threshold for each of the fast and slow-shear slownesses.

Determine at Step 414 the axial, radial, and hoop stresses at each of the radial positions identified in Step 412. These values provide estimates of the in-situ yield stress state of the rock at this depth. The difference between the maximum and minimum principal stresses is equal to two times the shear stress at the yield point.

The three principal stresses at the yield radial distance can be used to determine nine stress coefficients of plane-wave velocities and to further determine the elastic limit of octahedral stress under in-situ conditions of pressure and temperature at Step 416.

There are known techniques known in the art that can be used to estimate rock unconfined or confined compressive strengths that have applications in wellbore stability and design of optimal mud weight once the in-situ stress state has been determined.

In the absence of a borehole, the far-field stresses are given by $$\sigma_{rr} = \frac{(\sigma_H + \sigma_h)}{2} + \frac{(\sigma_H - \sigma_h)}{2}\cos 2\theta, \qquad (6)$$

-continued $$\sigma_{\theta\theta} = \frac{(\sigma_H + \sigma_h)}{2} - \frac{(\sigma_H - \sigma_h)}{2}\cos 2\theta, \qquad (7)$$

$$\sigma_{r\theta} = -\frac{(\sigma_H - \sigma_h)}{2}\sin 2\theta, \qquad (8)$$

$$\sigma_{ZZ} = \sigma_V, \qquad (9)$$

Subtracting the far-field stresses from the near-wellbore stresses, yields incremental stresses upon approach to the borehole surface $$\Delta\sigma_{rr} = \frac{(\sigma_H + \sigma_h)}{2}\left(\frac{a^2}{r^2}\right) - \frac{(\sigma_H - \sigma_h)}{2}\left(\frac{4a^2}{r^2} - \frac{3a^4}{r^4}\right)\cos 2\theta - P_W\frac{a^2}{r^2}, \qquad (10)$$

$$\Delta\sigma_{\theta\theta} = \frac{(\sigma_H + \sigma_h)}{2}\left(\frac{a^2}{r^2}\right) + \frac{(\sigma_H - \sigma_h)}{2}\left(\frac{3a^4}{r^4}\right)\cos 2\theta + P_W\frac{a^2}{r^2}, \qquad (11)$$

$$\Delta\sigma_{r\theta} = -\frac{(\sigma_H - \sigma_h)}{2}\left(\frac{2a^2}{r^2} - \frac{3a^4}{r^4}\right)\sin 2\theta \qquad (12)$$

$$\Delta\sigma_{ZZ} = -\nu(\sigma_H - \sigma_h)\frac{2a^2}{r^2}\cos 2\theta, \qquad (13)$$

where $P_W$ denotes the wellbore pressure at a given depth. The mean stress $\sigma_m$ is simply given by $$\sigma_m = \frac{1}{3}(\sigma_{rr} + \sigma_{\theta\theta} + \sigma_{ZZ}), \qquad (14)$$

and the octahedral stress $\tau_{oct}$ is given by $$\tau_{oct} = \frac{1}{3}\sqrt{\frac{(\sigma_{rr} - \sigma_{\theta\theta})^2 + (\sigma_{rr} - \sigma_{ZZ})^2 + }{(\sigma_{ZZ} - \sigma_{\theta\theta})^2 + 6(\sigma_{r\theta}^2 + \sigma_{rZ}^2 + \sigma_{\theta Z}^2)}}, \qquad (15)$$

The maximum stress concentration occurs at the borehole surface at an azimuth of $\theta=\pi/2$, from the maximum horizontal stress direction, and the corresponding stresses are given by $$\sigma_{rr} = P_W, \qquad (16)$$

$$\sigma_{\theta\theta} = 3\sigma_H - \sigma_h - P_W, \qquad (17)$$

$$\sigma_{r\theta} = 0, \qquad (18)$$

$$\sigma_{ZZ} = \sigma_V + 2\nu(\sigma_H - \sigma_h), \qquad (19)$$

where $P_W$ denotes the wellbore pressure. Calculations presented herein follow the convention that a compressive stress is negative and tensile stress is positive.

Substituting these stress components into the expression for the octahedral stress, yields two limits of the wellbore pressure $P_W$ that define a safe wellbore pressure for the octahedral stress less than its elastic limit for the rock lithology at hand. The lower limit is then given by equation (20)

$$P_W^{Lower} = \frac{3\sigma_H - \sigma_h}{2} - \frac{1}{6}\sqrt{54\tau_{oct}^2 + 9(3\sigma_H - \sigma_h)^2 - 6C}, \qquad (20)$$

and the upper limit on the wellbore pressure is given by equation (21)

$$P_W^{Upper} = \frac{3\sigma_H - \sigma_h}{2} + \frac{1}{6}\sqrt{54\tau_{oct}^2 + 9(3\sigma_H - \sigma_h)^2 - 6C}, \quad (21)$$

where the value C is given by equation (22)

$$C = (3\sigma_H - \sigma_h)^2 + \{\sigma_{ZZ} + 2\nu(\sigma_H - \sigma_h)\}^2 + \{\sigma_{ZZ} - 3\sigma_H + \sigma_h + 2\nu(\sigma_H - \sigma_h)\}^2, \quad (22)$$

The axial stress $\sigma_{ZZ}$ is given by equation (19) as a function of radial position, and $\nu$ is the Poisson's ratio. These estimates given by equations (20) and (21) for the upper and lower wellbore pressures are generally applicable for reservoir sand that do not exhibit a significant amount of viscoelastic deformation and creep flow as is the case in shale and salt formations.

The near-wellbore stress distribution can be mapped into a corresponding velocity distribution using stress-coefficients of velocities in terms of formation nonlinear constants. At least one such mapping process is described in U.S. Pat. No. 6,351,991, issued Mar. 5, 2002, entitled "Determining Stress Parameters of Formations from Multi-Mode Velocity Data," assigned to Schlumberger and incorporated herein by reference in its entirety. In particular, incremental stresses above and beyond those present in the far-field can be used to calculate radial variations in the fast- and slow-shear velocities (or slownesses) as we approach the borehole surface along the maximum and minimum horizontal stress directions.

Borehole sonic data can be used to determine up to three shear slownesses, or equivalently, three shear moduli in anisotropic formations. Crossed-dipole sonic data from a borehole parallel to the $X_3$ axis (FIG. 6) provides estimates of shear slowness anisotropy in terms of shear moduli $C_{44}$ and $C_{55}$ in the two orthogonal planes. For example, the two vertical shear moduli $C_{44}$, $C_{55}$ can be estimated directly from the zero frequency asymptotes of crossed-dipole dispersions in a vertical well parallel to the $X_3$ axis.

The incremental change in shear modulus $\Delta C_{55}$ and $\Delta C_{44}$ can be expressed in terms of the incremental changes in the principal stresses along a given azimuth as given by equations (23) and (24).

$$\Delta C_{55} = \left[1 + \frac{C_{55}}{Y} - \nu\frac{C_{144}}{Y} + (1-\nu)\frac{C_{155}}{Y}\right] \quad (23)$$
$$\Delta\sigma_{ZZ} + \left[\frac{C_{55}}{Y} - \nu\frac{C_{144}}{Y} + (1-\nu)\frac{C_{155}}{Y}\right]\Delta\sigma_H + \left[\frac{C_{144}}{Y} - (1+2\nu)\frac{C_{55}}{Y} - 2\nu\frac{C_{155}}{Y}\right]\Delta\sigma_h,$$

$$\Delta C_{44} = \left[1 + \frac{C_{44}}{Y} - \nu\frac{C_{144}}{Y} + (1-\nu)\frac{C_{155}}{Y}\right] \quad (24)$$
$$\Delta\sigma_{ZZ} + \left[\frac{C_{44}}{Y} - \nu\frac{C_{144}}{Y} + (1-\nu)\frac{C_{155}}{Y}\right]\Delta\sigma_h + \left[\frac{C_{144}}{Y} - (1+2\nu)\frac{C_{44}}{Y} - 2\nu\frac{C_{155}}{Y}\right]\Delta\sigma_H,$$

The terms $C_{144}$, $C_{155}$ represent higher-order coefficients of nonlinear elasticity. A third shear modulus $C_{66}$ in the cross-sectional plane of the borehole can be estimated from the monopole Stoneley data in anisotropic formations.

The values $\Delta C_{55}$, $\Delta\sigma_{ZZ}$, $\Delta\sigma_H$, $\Delta\sigma_h$, and $\Delta C_{44}$, can be expressed as functions of the radius (e.g., r/a). As presented herein, equations (22) and (23) are generalized to be valid in the presence of stress distributions and attribute local changes in the effective shear moduli $\Delta C_{55}$ and $\Delta C_{44}$ to be caused by corresponding changes in the horizontal stresses $\Delta\sigma_H$ and $\Delta\sigma_h$, while the material linear and nonlinear constants are held fixed.

The radial variation in the fast-shear velocity can then be given by equation (25).

$$V_{FS}^2(r/a) = V_{FS}^2(r/a \to \infty) + \frac{\Delta C_{55}(r/a)}{\rho} \quad (25)$$

The radial variation in the slow-shear velocity can be expressed as in equation (26).

$$V_{SS}^2(r/a) = V_{SS}^2(r/a \to \infty) + \frac{\Delta C_{44}(r/a)}{\rho} \quad (26)$$

A dipole source placed in a fluid-filled borehole generates primarily the lowest-order flexural mode together with compressional and shear headwaves (in fast formations), and leaky-compressional modes in the presence of near-wellbore alteration. Many of the geophysical interpretations are based on analyzing the borehole flexural dispersion obtained from an array of recorded waveforms using a modified matrix pencil algorithm that helps in isolating both the dispersive and non-dispersive arrivals in the wave train.

FIG. 9 summarizes various steps in the estimation of in-situ yield stress and the elastic limit of octahedral stress under in-situ conditions of confining pressure and temperature. Estimates of in-situ yield stress have applications in estimating the rock confined compressive strength through a boost factor determined from laboratory measurements on core samples. The elastic limit of octahedral stress can be used to estimate a safe mud weight window that would avoid borehole shrinkage or expansion either during or after drilling. Note that exceeding the elastic limit of octahedral stress causes creep flow in the rock that can result in a significant reduction in borehole diameter.

The above technique can be performed in an open wellbore and one which has been already been cased. Beneficially, the technique can also be repeated periodically to revise the in-situ stress state estimate as it may change during time.

In summary, the in-situ yield stress state of rock together with the elastic limit of octahedral stress can be obtained by comparing measurement-based radial profiles of shear slowness along the maximum and minimum horizontal stress directions with theoretical or predicted profiles obtained using an acoustoelastic model that does not account for any plastic yielding of rock. The radial position is located where the measurement-based shear slowness profile starts to deviate from the predicted shear slowness profile. This approach can be repeated for each of the slow-shear and fast-shear azimuthal directions. The principal stresses at that radial position are calculated from the far-field formation stresses are determine, for example, using the elastic deformation theory that yields the near-wellbore stress distributions in the presence of a borehole. Estimates of in-situ yield stress state can then be used to obtain the unconfined compressive strength that is required in the wellbore stability analysis (see e.g., "Rock strength parameters from annular pressure while drilling and dipole sonic dispersion analysis, by Bratton et al., presented at the SPWLA Annual Meeting held Jun. 6-9, 2004).

While this invention has been particularly shown and described with references to preferred embodiments thereof, it will be understood by those skilled in the art that various changes in form and details may be made therein without departing from the scope of the invention encompassed by the appended claims.

What is claimed is:

1. A method for determining an in-situ rock yield stress state of a geological formation surrounding a borehole, comprising:
   providing a borehole logging tool configured to be placed within the borehole, the borehole logging tool being configured to excite a sonic response within the borehole and to record a plurality of waveforms indicative of the sonic response;
   providing a processor, the processor containing instructions which when executed cause the processor to receive the plurality of recorded waveforms and to analytically:
   a. determine within at least one axial plane containing a borehole axis a radial profile for each of an axial effective stress, a radial effective stress, and a hoop effective stress;
   b. calculate from the effective stresses within the at least one axial plane a predicted radial shear response radial profile;
   c. determine from the plurality of recorded waveforms, a waveform-based estimate of a shear response radial profile within the at least one axial plane;
   d. identify within the at least one axial plane, a maximum radial distance at which a difference between the predicted shear response radial profile and the waveform-based estimated shear response radial profile is greater than a difference threshold; and
   e. determine at the identified maximum radial distance, the respective axial, radial, and hoop stresses, the identified stresses being indicative of an in-situ yield stress state of the rock.

2. The method of claim 1, wherein the acts a through e are repeated in each of two orthogonal axial planes, the identified stresses in each of the two orthogonal axial planes being indicative of an in-situ yield stress state of the rock.

3. The method of claim 2, wherein the two orthogonal axial planes coincide with the fast-shear and slow-shear directions.

4. A method for determining an in-situ rock yield stress state of a geological formation surrounding a borehole, comprising:
   providing a borehole logging tool configured to be placed within the borehole, the borehole logging tool being configured to excite a sonic response within the borehole and to record a plurality of waveforms indicative of the sonic response;
   providing a processor, the processor containing instructions which when executed cause the processor to receive the plurality of recorded waveforms and to analytically:
   a. determine, in each of a fast-shear and slow-shear azimuthal directions, a respective radial profile for each of an axial effective stress, a radial effective stress, and a hoop effective stress;
   b. calculate from the effective stresses, in each of the fast-shear and slow-shear azimuthal directions, a respective predicted radial profile for each of a fast-shear response and a slow-shear response;
   c. determine from the plurality of recorded waveforms, a waveform-based estimate of a respective radial profile of shear response in each of the fast-shear and slow-shear azimuthal directions;
   d. identify in each of the fast-shear and slow-shear azimuthal directions, a respective maximum radial distance at which a difference between the respective predicted shear response radial profile and the respective waveform-based estimated shear response radial profile is greater than a difference threshold; and
   e. determine at the identified maximum radial distance, in each of the fast-shear and slow-shear azimuthal directions, the respective axial, radial, and hoop stresses, the identified stresses indicative of an in-situ yield stress state of the rock.

5. The method of claim 4, wherein the predicted shear response radial profile is a shear slowness radial profile and the waveform-based estimated shear response radial profile is a shear slowness radial profile.

6. The method of claim 4, further comprising calculating, with the processor, in each of the fast-shear and slow-shear azimuthal directions, a respective elastic limit of octahedral stress using the determined stresses indicative of the in-situ yield stress state of the rock.

7. The method of claim 6, further comprising substituting, with the processor, octahedral stress into analytical expressions for upper and lower well bore pressure limits, well bore pressures between the upper and lower limits indicative of a safe operating range of well bore pressures.

8. The method of claim 4, further comprising calculating, with the processor, in each of the fast-shear and slow-shear azimuthal directions, a respective plastic limit of octahedral stress using the identified stresses indicative of the in-situ yield stress state of the rock.

9. The method of claim 4, wherein the act of determining the respective radial profile for each of the axial, the radial, and the hoop effective stresses comprises:
   i. obtaining far-field overburden stress, a maximum horizontal stress, and a minimum horizontal stress; and
   ii. substituting the far-field overburden, maximum horizontal, and minimum horizontal stresses into an analytical expression providing the respective radial profile for each of the axial, radial, and hoop effective stresses comprises.

10. The method of claim 9, wherein the act of obtaining the maximum and minimum horizontal stresses comprises obtaining a low-frequency sonic response of the geological formation surrounding the borehole.

11. The method of claim 4, wherein the act of determining from the plurality of recorded waveforms, in each of the fast-shear and slow-shear azimuthal directions, a waveform-based estimate of a respective radial profile of shear response comprises dipole radial profiling a fast-shear response and a slow-shear response.

12. The method of claim 11, wherein the act of dipole radial profiling comprises:
   i. obtaining, in each of two orthogonal directions, a dispersion response to the sonic excitation of the geological formation surrounding the borehole;
   ii. transforming the dispersion response in each of the two orthogonal directions to an equivalent dispersion response in a respective one of the fast-shear and slow-shear azimuthal directions.

13. The method of claim 4, wherein the act of calculating the respective predicted radial profile for each of the fast-shear response and the slow-shear response comprises using stress coefficients of shear velocities and known stress variations determined in act a.

14. The method of claim 4, wherein the act of identifying, in each of the fast-shear and slow-shear azimuthal directions, a respective maximum radial distance at which the difference between the respective predicted shear response radial profile and the respective waveform-based estimated shear response radial profile comprises:
   i. graphically overlaying the respective predicted shear response radial profile and the respective waveform-based estimated shear response radial profile; and
   ii. determining a maximum radial distance at which a measurable shear response difference between the graphically overlaid radial profiles is greater than the difference threshold.

15. The method of claim 14, wherein the difference threshold is less than 10% of a maximum separation between the radial profiles.

16. A method for determining an in-situ rock yield stress state of a geological formation surrounding a depth interval of a borehole, comprising:
   providing a borehole logging tool configured to be placed within the borehole, the borehole logging tool being configured to excite a sonic response within the borehole and to record a plurality of waveforms indicative of the sonic response;
   providing a processor, the processor containing instructions which when executed cause the processor to receive the plurality of recorded waveforms and to analytically:
   a. estimate a far-field formation effective stresses and stress coefficients of shear response;
   b. estimate from the plurality of recorded waveforms, radial profiles of formation shear response along each of the fast-shear and slow-shear azimuthal directions;
   c. calculate in each of a fast-shear and slow-shear azimuthal directions, predicted radial profiles of formation shear response;
   d. identify radial position at which the waveform-based radial profile of formation shear response deviates from the predicted radial profile beyond a deviation threshold; and
   e. determine the effective stress values at the identified radial position, the identified stress values indicative of an in-situ yield stress state of the geological formation at the depth interval.

17. The method of claim 16, wherein the act of recording a plurality of waveforms indicative of the sonic response and estimating from the plurality of waveforms, dipole radial profiles of formation shear response along each of the fast-shear and slow-shear azimuthal directions comprises:
   i. recording the plurality of waveforms in each of two orthogonal directions at the depth interval;
   ii. determining from each of the recorded plurality of waveforms, a respective dispersion radial profile in each of the two orthogonal directions; and
   iii. transforming the respective dispersion radial profiles determined in the two orthogonal directions to equivalent dispersion radial profiles in fast-shear and slow-shear azimuthal directions.

18. The method of claim 17, wherein the act of determining the respective dispersion radial profiles comprises using a modified matrix pencil algorithm.

19. The method of claim 16, wherein the shear response comprises at least one of shear velocity and shear slowness.

20. A system for determining an in-situ rock yield stress state of a geological formation surrounding a borehole, comprising:
   a borehole logging tool configured to be placed at a desired depth interval within the borehole, the logging tool being configured to excite a sonic response within the borehole and to record a plurality of waveforms indicative of the sonic response within the depth interval; and
   a processor in communication with the borehole sonic logging tool, the processor comprising:
      means for receiving the plurality of recorded waveforms;
      means for analytically determining radial variations of each of axial, radial, and hoop effective stresses;
      means for estimating from the received plurality of recorded waveforms a respective radial profile of shear response;
      means for determining a respective maximum radial distance at which a difference between the respective predicted shear response radial profile and the respective estimated response radial profile determined from measured data is greater than a difference threshold; and
      means for identifying at the determined maximum radial distance the respective axial, radial, and hoop effective stresses, the effective stresses providing an indication of an in-situ yield stress state of the rock.

21. The system of claim 20, wherein the excited sonic response is a broadband response.

22. The system of claim 21, wherein the broadband response extends between at least 200 Hz and 9,000 Hz.

23. The system of claim 20, wherein the borehole logging tool comprises a dipole piezoelectric source and a plurality of hydrophone dipole receivers spaced apart along a selected length of the borehole.

24. A system for determining an in-situ rock yield stress state of a geological formation surrounding a borehole, comprising:
   a processor, the processor comprising:
      means for predicting, in each of a fast-shear and slow-shear azimuthal directions, a respective radial profile for each of an axial, a radial, and a hoop effective stresses;
      means for calculating from the predicted effective stresses, in each of the fast-shear and slow-shear azimuthal directions, a respective predicted radial variation for each of a fast-shear response and a slow-shear response;
      means for determining from measured data, in each of the fast-shear and slow-shear azimuthal directions, a measurement-based estimate of a respective radial profile of shear response;
      means for identifying in each of the fast-shear and slow-shear azimuthal directions, a respective maximum radial distance at which a difference between the respective predicted shear response radial profile and the respective measurement-based estimated shear response radial profile is greater than a difference threshold; and
      means for determining at the identified maximum radial distance, in each of the fast-shear and slow-shear azimuthal directions, the respective axial, radial, and hoop stresses, the identified stresses indicative of an in-situ yield stress state of the rock.

* * * * *